May 8, 1923.
J. J. MOORE
1,454,178
COMBINED TRACTOR AND TRUCK
Filed May 7, 1920
4 Sheets-Sheet 2
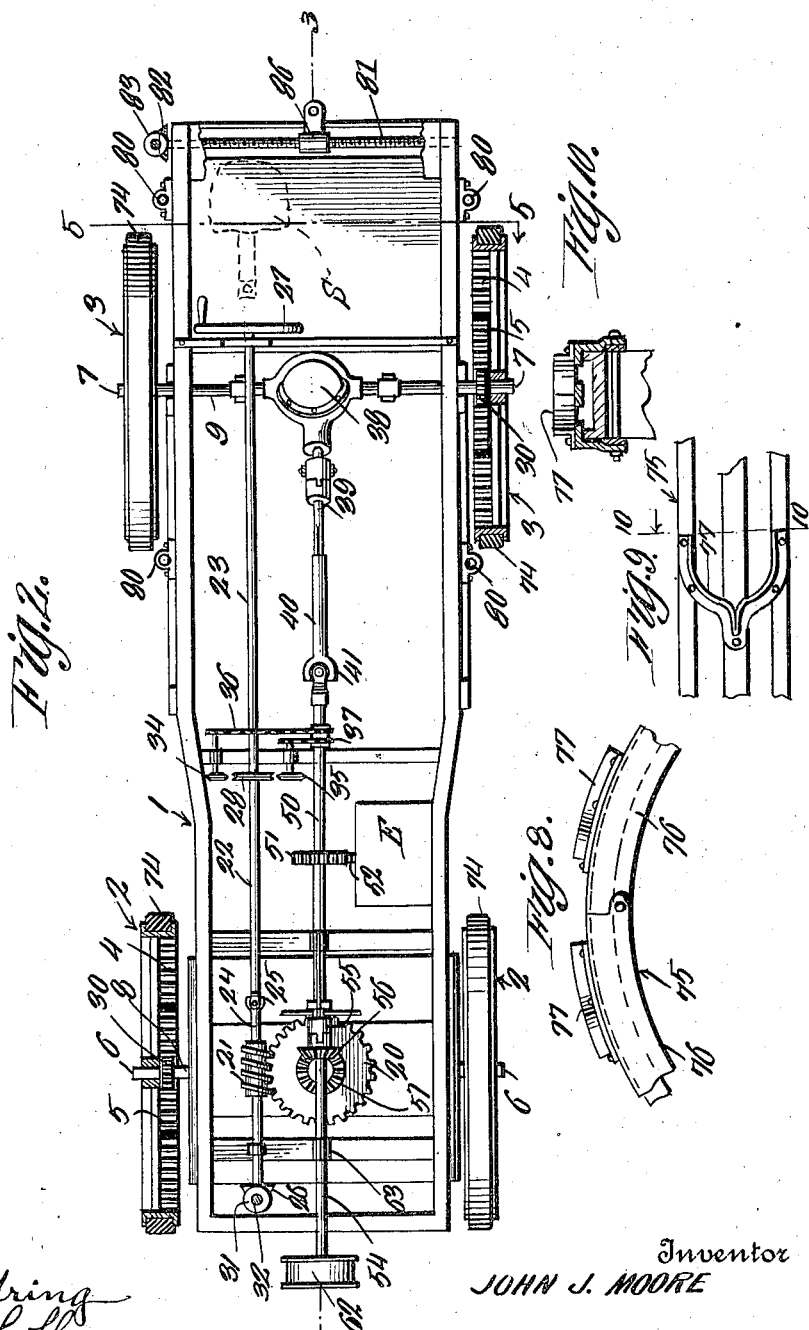
WITNESSES
Guy M. String
S. M. McColl
Inventor
JOHN J. MOORE
By Richard B. Owen
Attorney

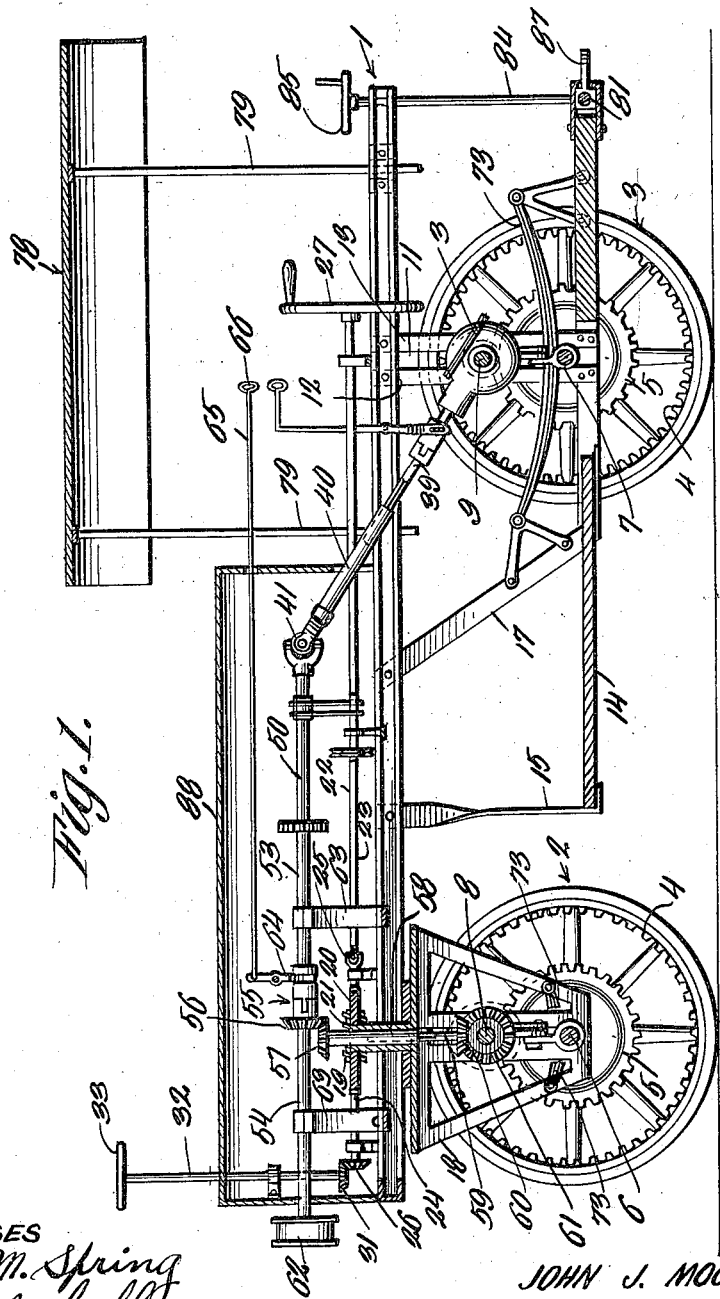

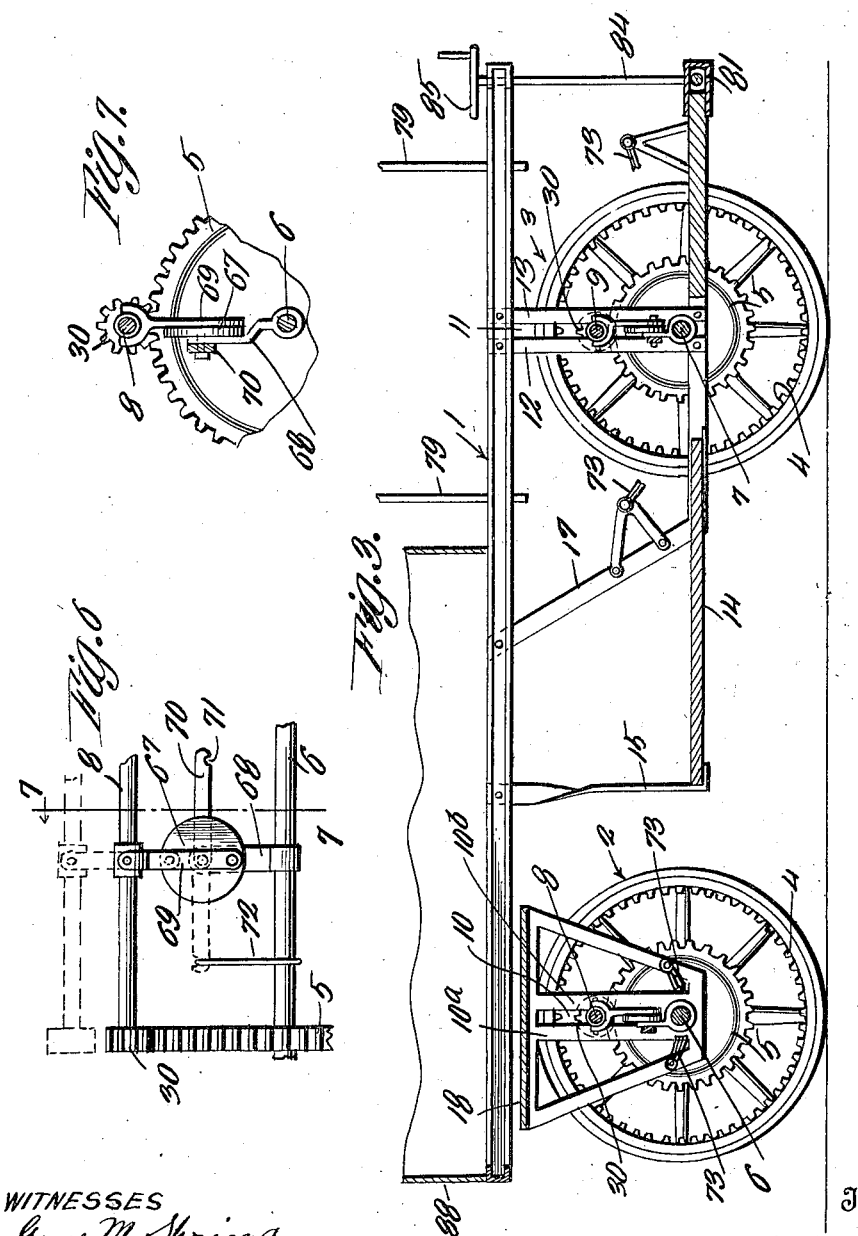

May 8, 1923.
J. J. MOORE
1,454,178
COMBINED TRACTOR AND TRUCK
Filed May 7, 1920
4 Sheets-Sheet 4
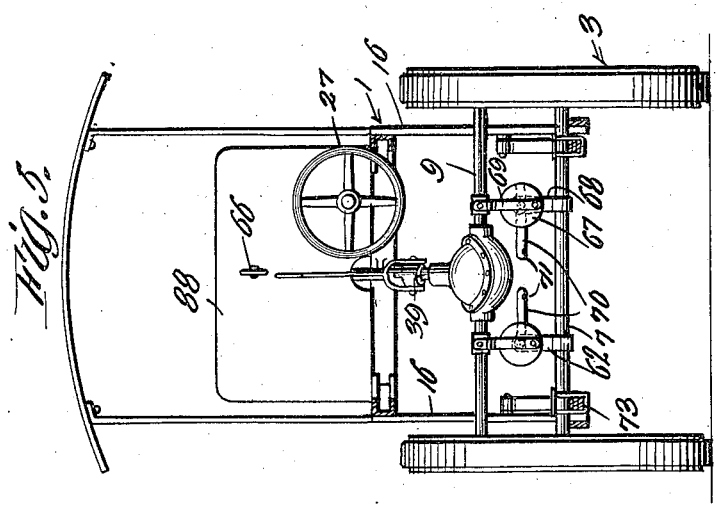
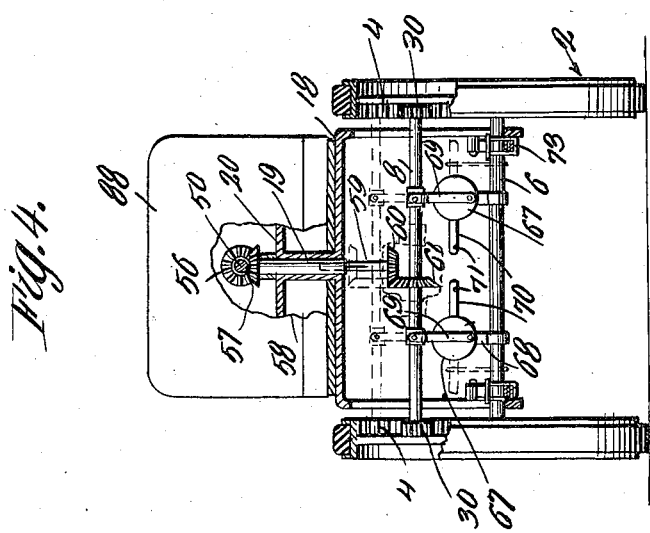
WITNESSES
Guy M. Spring
S. M. McColl
Inventor
JOHN J. MOORE
By Richard B. Owen
Attorney Patented May 8, 1923.

1,454,178

UNITED STATES PATENT OFFICE.

JOHN J. MOORE, OF BATAVIA, NEW YORK.

COMBINED TRACTOR AND TRUCK.

Application filed May 7, 1920. Serial No. 379,606.

*To all whom it may concern:*

Be it known that I, JOHN J. MOORE, a citizen of the United States, residing at Batavia, in the county of Genesee and State of New York, have invented certain new and useful Improvements in Combined Tractors and Trucks, of which the following is a specification.

This invention relates to a combined tractor and truck.

The main object of the invention is to provide a machine of this character which may be quickly changed from a tractor to a truck and vice versa and also be operated either as a medium or heavy weight tractor.

Another object is to so construct such a machine that it will perform all the functions of a tractor and yet may be changed in a few minutes to a truck capable of traveling at a high rate of speed.

Another object is to provide a tractor, all four of the wheels of which are operable as traction or drive wheels and equipped with mechanism for throwing out the front wheels when desired and use them simply as steering wheels.

Another object is to provide steering mechanism operable either from the front or the rear of the machine.

Another object is to provide steering mechanism operable either by hand or automatically through the machine.

Another object is to provide a tractor with a laterally shiftable implement connecting device capable of being shifted in either direction, the entire width of the machine without stopping, so that closer work to the fence lines can be effected.

Another object is to so construct a machine of this character that the front wheels may turn completely around under the front of the machine, making it possible to turn the machine around in a very short space.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:

Figure 1 represents a longitudinal section of a machine embodying this invention.

Fig. 2 is a top plan view thereof with parts in section and parts broken out.

Fig. 3 is a longitudinal section taken on the line 3—3 of Fig. 2.

Fig. 4 is a front elevation with parts broken out and parts in section.

Fig. 5 is a rear elevation with parts in section.

Fig. 6 is a detail sectional view showing the means for raising and lowering one of the jack shafts.

Fig. 7 is a transverse section taken on the line 7—7 of Fig. 6.

Fig. 8 is a detail side elevation of one of the tractor shoes.

Fig. 9 is a plan view thereof; and

Fig. 10 is a transverse section taken on the line 10—10 of Fig. 9.

In the embodiment illustrated the machine constituting this invention comprises a substantially rectangular frame 1 constructed of angle iron U-shaped in cross section, said frame being preferably wider at the rear than at the front, as shown in Fig. 2. This frame is mounted on a pair of front wheels 2 and rear wheels 3, all of which are constructed to operate as traction or drive wheels. These wheels are exactly alike and each includes an annular gear 4 arranged on the inner face of the rim of the wheel and carries a gear 5 much smaller in size than the gear 4, and which are designed to be alternately meshed with cog-wheels 30, carried by jack-shafts 8 and 9, the front wheels 2 being mounted on an axle 6 and the rear wheels on an axle 7.

These axles 6 and 7 are supported in bearings carried by frames depending from frame 1, the front wheel carrying frame including a guide 10 in which the jackshaft 8 is mounted to move vertically between bars 10$^a$ and 10$^b$ which form the guide 10. These bars depend from a platform or plate 18 which has rising therefrom a sleeve 19 carrying at its upper end a worm gear 20 which meshes with a worm 21 on a steering shaft 22 and which is operable in a manner hereinafter to be described.

The steering rod or shaft 22 is composed of two sections 23 and 24 connected at their inner ends by a universal joint 25 which permits section 23 to be shifted laterally for a purpose presently to be described. Section 24 carries at its front end a bevel gear 26 which meshes with a similar gear 31 carried by an upright steering post 32 having a steering wheel 33 for actuating it, The section 23 of the steering shaft 22 has mounted on its rear end a steering wheel 27 positioned for convenient actuation by the operator who usually occupies the seat shown at S. The section 23 also has fixed thereto a friction gear 28 which is designed to be brought into meshing engagement with gears 34 and 35 at the will of the operator. Both of the gears 34 and 35 are driven by the main drive shaft 50 receiving motion through chains 36 and 37 respectively so that when the shaft section 23 is moved to the right the gear 28 will be engaged with gear 34 whereby the machine will be steered through the main shaft 50 by the engine E. When section 23 is moved to the left the gear 28 will engage gear 35 and the machine steered in the opposite direction. Normally, gear 28 is in the position shown in Fig. 2 out of mesh with the gears 34 and 35, so that the machine may be steered manually by the operator.

The jackshaft 9 which carries the cog wheels 30 designed to cooperate with the driving gears 4 and 5 on the rear wheels 3 is mounted to move vertically in a guide 11 between side bars 12 and 13 secured to the frame 1 and depending therefrom supporting at their lower ends a platform 14 which is further supported by depending brace bars 15 and 16 which support the opposite ends of the platform 14, diagonal braces 17 supporting the intermediate portion thereof.

The jackshaft 9 is connected with the differential 38 which is not shown in detail, since it is of ordinary construction. A shaft 39 extends therefrom and telescopically engages a sleeve 40 which is connected at its inner end by universal joint 41 with the rear end of the main driving shaft 50.

It is, of course, understood that the shaft section 39 is angular in cross section and that the interior of the sleeve 40 is similarly formed so that these members will rotate in unison and yet be capable of longitudinal movement toward or from each other to provide for the raising and lowering of the jackshaft 9 in the guide 11.

The main drive shaft 50 has a gear wheel 51 fixed thereto and meshes with the gear 52 actuated by the engine indicated at E. This engine is intended to be a 75 H. P. steam engine of suitable construction. The main drive shaft 50 is composed of two sections 53 and 54 designed to be connected by a clutch 55, one member of which carries a bevel gear 56 which meshes with a similar gear 57 fixed to the upper end of a vertically movable shaft 58 mounted to rotate in the sleeve 19. The shaft 58 is made hollow to receive a cooperating shaft member 59 carried by a bevel gear 60 which meshes with a similar gear 61 on the front jackshaft 8, the telescopical engagement of the shaft 59 with the shaft 58 providing for the vertical movement of the jackshaft 8 so that the cog wheels 30 carried at the ends thereof may be brought at the will of the operator into meshing engagement with either of the gears 4 or 5 carried by the front wheels 2.

A band pulley 62 is carried by the front end of the shaft section 54 and is designed to operate through a band, not shown, any machinery desired to be driven by the tractor. The main shaft 50 is shown rotatably mounted in bearings carried by upstanding standards 63 supported by frame 1.

A clutch actuating lever 64 engages the shiftable member of clutch 55 and has a rod 65 connected with its upper end and extended to the rear of the machine, being equipped with a hand grip 66 positioned for convenient actuation by the operator. From the above description it will be obvious that by shifting the clutch member connected with the rod 65 the front wheels may be thrown into or out of engagement with the driving shaft member 53. When they are engaged therewith the front wheels 2 operate as traction wheels and when the clutch is disengaged they are free to be used as steering wheels only.

When the machine is to be used as a tractor the cog wheels which are driven by the engine through the main shaft and the mechanism above described, are brought into meshing engagement with the annular gear 4 carried by the front wheels 2. The positioning of these cogs 30 is controlled by an eccentric mechanism shown in detail in Fig. 6, which includes two disk shaped cam members 67 rotatably mounted on standards or posts 68 carried by the front axle 6, as is shown clearly in Figs. 4 and 6. Pivoted adjacent the periphery of each of the disks 67 is a link 69 carried by the jackshaft 8 so that when said disks 67 are turned in one direction the shaft 8 will be raised as shown in dotted lines in Fig. 6 and when turned in the opposite direction it will be lowered into a full line position, shown in Fig. 6. When lowered, the cogs 30 carried by said jackshaft mesh with the smaller gear 5 of the front wheels 2 and when raised said cogs mesh with the larger gear 4.

To provide for the actuation of these disks a lever 70 is provided, and which is here shown equipped with a notch 71 in its free end which is designed to be hooked over a loop shaped link 72 carried by the axle 6, when said lever is swung into position to actuate the disk for raising the shaft 8 (see dotted lines in Fig. 6). As is shown clearly in Fig. 4, two of these eccentrics 67 are employed, each having an actuating lever 70 and which are designed to be manually operated for changing the position of the cogs 30 according to whether it is desired to use the machine as a tractor or truck, it being understood that when the cogs 30 mesh with the larger gears 4 slow motion is imparted to the wheels, such as is desirable when the machine is to be used as a tractor, and when they are brought into meshing engagement with the smaller gears 5 more rapid operation of the wheels is produced, such as is necessary when the machine is to be used as a truck.

The mechanism above described for raising and lowering the jackshaft 8 is duplicated at the rear of the machine for raising and lowering the rear jackshaft 9 and the parts are correspondingly numbered.

The frame 1 is supported by springs 73 located at both the front and rear of the vehicle to adapt the machine for use as a truck and to insure the easy riding thereof.

When the machine is to be used as a truck solid rubber tires 74 are placed on the wheels, both front and rear, and when used as a tractor these tires or shoes 74 are removed and the shoes shown at 75 in Figs. 8, 9 and 10 replace them. These shoes 75 are constructed in pivotally connected links 76 having on their outer faces traction or gripping elements 77, which may be of any desired configuration, being preferably in the form shown in Fig. 9.

It will thus be seen that with the consumption of a very few minutes this machine may be transformed from a tractor into a truck and vice versa. The only change made when converting it into a tractor from a truck is to remove the solid tires 74, replace them by the shoes 75, and then raise the jackshafts 8 and 9 to bring the cog wheels 30, carried thereby, into meshing engagement with the large gears 4. When changing from a tractor to a truck the operation is reversed and the shoes 75 are replaced by the tires 74 and the jackshafts 8 and 9 lowered to bring the cog wheels 30 into meshing engagement with the gears 5, when the machine is ready to be actuated as a truck. If desired, the front wheels may be disconnected from the main driving shaft 50 to permit them to be used as steering wheels and this is accomplished by shifting of the lever 64 through the rod 65 so as to throw the members of clutch 55 out of engagement, thereby leaving the front wheels free for use as steering wheels. These wheels may then be steered by the operator through the steering rod 22 and the wheel 27 from the rear of the machine, or they may be controlled by the engine, the operator having first shifted the rod sections 23 of said shaft 22 to bring the gear 28 into engagement with one or the other of gears 34 or 35, according to the direction it is desired to turn the machine. This form of steering is especially useful when the machine is used as a tractor. It will be obvious that when this form of steering is employed, all that the driver or operator is required to do is to move the shaft section 23 laterally in the direction it is desired the machine to travel, the force required for steering the machine emanating from the engine E. It is also apparent from the drawings and the above description that reversed driving as well as speed variation is effected on driving the one or the other wheel gear.

A canopy or cover 78 is preferably used, being supported on rods 79 removable in sockets 80 carried by the side members of frame 1. This canopy is designed to effect protection from the weather to the operator.

It is, of course, understood that any form of body may be mounted on the frame 1 when the machine is to be used as a truck.

To adapt the machine for use as a heavy tractor ballast of any suitable nature is placed on the platform 14 at the front portion thereof and when desired to be used as a light weight tractor, this ballast is removed.

Arranged at the rear of the machine and extending transversely between the side members of frame 1 is a screw threaded shaft or rod 81, having a bevel gear 82 at one end thereof which meshes with a cooperating gear 83 carried by an upright shaft 84 having a hand wheel 85 at its upper end. An implement connected member 86 is mounted on the screw shaft 81 having threaded engagement therewith so that when said shaft is turned this member 86 will travel transversely of the frame 1 in one direction or the other, so as to position it in desired position to suitably locate the implements connected therewith so that they may be employed for close work in connection with fence lines or the like. This member 86 may be in the form of a clevis and is here shown having a laterally extended apertured ear 87 to have connected therewith any suitable implements, such as plows, cultivators, or the like.

A casing or hood 88 is preferably employed at the front of the machine for enclosing the operating parts, such as the gear shifts, and the like, to protect them from the dust and the weather, and this hood may be of any suitable or desired construction.

Having thus fully described my invention, what I claim as new and desire to secure by Letters Patent, is:

1. In a machine of the class described, a wheel supported structure, driving gears of different size fixed to each of said wheels, a drive shaft having a gear fixed thereto, a vertically movable jack-shaft carrying cogs to mesh with the gears on said wheels, a bevel gear carried by said jack-shaft, a connection between said drive and jack shafts whereby the latter is actuated by the former, said connection comprising a shaft composed of telescoping sections, one having a gear meshing with the gear on said drive shaft and the other a gear meshing with the gear on the jack-shaft, whereby the jack-shaft is actuated by the drive shaft and the jack-shaft permitted to move vertically relatively to said drive shaft.

2. In a machine of the class described, a wheel supported structure, driving gears of different size fixed to each of said wheels, said gears alining and spaced radially from each other, a vertically movable jack-shaft carrying cogs positioned to mesh alternately with the gears on said wheels, a connection between said drive and jack shafts whereby the latter is actuated by the former, said connection including telescopically engaged members to permit the vertical movement of the jack-shaft, and means for moving said jack-shaft.

3. In a machine of the class described a wheel supported frame, a drive shaft, hangers depending from said frame and having vertically disposed guides, said wheels being mounted in said hangers and each equipped with radially opposed gears, jack-shaft mounted to move vertically in said guides and carrying cog wheels positioned to mesh with the gears on said supporting wheels, and a connection between said jack-shaft and said driving shaft whereby the jack-shaft is actuated by the drive shaft.

In testimony whereof I affix my signature in presence of two witnesses.

JOHN J. MOORE.

Witnesses:
A. C. GORDON,
LUCIUS C. ATWATER.